(12) United States Patent
Daimon et al.

(10) Patent No.: US 8,036,411 B2
(45) Date of Patent: Oct. 11, 2011

(54) PORTABLE COMMUNICATION TOOL

(75) Inventors: Kenzoh Daimon, Hiroshima (JP);
Kimiaki Imai, Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 1244 days.

(21) Appl. No.: 11/494,456

(22) Filed: Jul. 28, 2006

(65) Prior Publication Data

US 2007/0049357 A1 Mar. 1, 2007

(30) Foreign Application Priority Data

Aug. 23, 2005 (JP) ................................ 2005-241450

(51) Int. Cl.
*H04R 1/20* (2006.01)
(52) U.S. Cl. .................... 381/346; 381/347; 381/354
(58) Field of Classification Search .................. 381/334, 381/347, 391; 455/350, 575.1
See application file for complete search history.

(56) References Cited

U.S. PATENT DOCUMENTS

| | | | |
|---|---|---|---|
| 5,754,669 A * | 5/1998 | Shiota et al. .................. 381/386 |
| 5,825,903 A | 10/1998 | Shiota et al. | |
| 6,064,894 A * | 5/2000 | Zurek et al. ................. 455/569.1 |
| 6,321,070 B1 * | 11/2001 | Clark et al. ................. 455/575.1 |
| 7,450,976 B2 * | 11/2008 | Hoshijima ................. 455/575.1 |
| 2004/0207978 A1 | 10/2004 | Ueda et al. | |
| 2004/0264688 A1 | 12/2004 | Hampton et al. | |

FOREIGN PATENT DOCUMENTS

| | | |
|---|---|---|
| EP | 1 478 206 A2 | 11/2004 |
| JP | 55-104887 | 8/1980 |
| JP | 59-166584 U | 11/1984 |
| JP | 61-163497 U | 9/1986 |
| JP | 6-29252 U | 4/1994 |
| JP | 09-215076 A | 8/1997 |
| JP | 2002-152871 A | 5/2002 |
| JP | 2003-143677 A | 5/2003 |
| JP | 2003-304587 A | 10/2003 |
| JP | 2004-304420 A | 10/2004 |

* cited by examiner

*Primary Examiner* — Curtis Kuntz
*Assistant Examiner* — Ryan Robinson
(74) *Attorney, Agent, or Firm* — Birch, Stewart, Kolasch & Birch, LLP (57) ABSTRACT

There are provided a speaker for outputting sound, a plurality of sound output holes formed in a reverse side cabinet, a mesh sheet, a two-sided tape, and a transparent sheet. The sound output holes, the mesh sheet, the two-sided tape, and the transparent sheet control the direction of sound output from the speaker.

9 Claims, 8 Drawing Sheets

PORTABLE COMMUNICATION TOOL

CROSS REFERENCE TO RELATED APPLICATIONS

This Non-provisional application claims priority under 35 U.S.C. §119(a) on Patent Application No. 2005-241450 filed in Japan on Aug. 23, 2005, the entire contents of which are hereby incorporated by reference.

BACKGROUND OF THE INVENTION

1. Field of the Invention

The present invention relates to a portable communication tool, such as a mobile phone and a PHS (Personal Handyphone System), and more relates to structures of sound output holes for outputting sound from a speaker.

2. Background Art

Recently, portable communication tools are being miniaturized more and more, such as mobile phones and PHSs, while equipping various functions of, for example, a television set, a videophone, and the like. Under the circumstances, it becomes necessary to provided a speaker besides a receiver for equipping the functions. Sound from the speaker is output through a plurality of sound output holes formed in a cabinet provided at the front of the speaker. Japanese Patent Application Laid Open Publication Nos. 9-215076A and 2002-152871A disclose such portable communication tools, for example.

In Japanese Patent Application Laid Open Publication No. 9-215076A, a speaker is provided at the reverse face of a cabinet, and through holes and dummy holes are formed at the front of the speaker. Further, the dummy holes are set to have a diameter of 3 mm or smaller and a depth of 0.5 mm or larger or set to have a bottom in a conical shape, a trapezoidal shape, or a hemispherical shape to cause diffuse reflection rather than direct reflection of light entering in the dummy holes. This arrangement makes it difficult to distinguish between the through holes and the dummy holes in view of outward appearance with a result of improved appearance.

In Japanese Patent Application Laid Open Publication No. 2002-152871A, dummy holes include first recessed parts formed in the front face portion of a transparent resin panel and second recessed parts formed in the back face portion of the transparent resin panel so as to be opposite the first recessed parts, and at least a region where a cabinet is in contact with the second recessed parts is colored in the same color as a diaphragm of a speaker mounted at the cabinet. This removes unnaturalness of difference in outward appearance between the sound output holes for the speaker and the dummy holes to contemplate excellent design. Also, the strength as before is maintained with the transparent resin panel, which is easily molded. This means a cabinet with a transparent resin panel formed by dies at low maintenance cost.

Referring to sound output from one speaker through sound output holes formed in a cabinet, it is known that change in positions of the sound output holes leads to change in quality of the output sound.

It is essential, however, to place importance on product design, and therefore, the sound quality falls in conflict with product design.

SUMMARY OF THE INVENTION

The present invention has been made in view of the foregoing and has its object of forming sound output holes which are advantageous to both the design and the sound quality by taking both of them into consideration.

To attain the above object, a first invention provides a portable communication tool, including:

a cabinet;

a speaker for outputting sound; and sound output control means for controlling a direction of sound output from the speaker, the sound output control means including a plurality of sound output holes formed in the cabinet, a mesh sheet, a two-sided tape, and a transparent sheet.

With the above arrangement, the direction of sound output from the speaker can be controlled with an easily assembled construction at low cost. The control of the direction of sound output from the speaker widens the ranges where the sound quality is changeable.

In a second invention, the sound output holes include a plurality of through holes that pass through the cabinet and a non-through hole recessed in an obverse face portion of the cabinet so as not to pass through the cabinet, and the non-through hole is arranged at a central part of a region where the sound output holes are arranged.

With the above arrangement, the non-through holes does not pass through the cabinet and are only recessed in the obverse face portion of the cabinet, which minimizes the difference in outward appearance from the through holes, attaining excellent outward appearance.

In a third invention, some of the through holes that passes through the cabinet are covered with the transparent sheet to serve as sound insulation holes that do not allow sound to pass therethrough.

With the above arrangement, the sound insulation holes, which are covered with the transparent sheet, have a function of not allowing sound to pass therethrough. The transparent sheet allows the sound insulation holes to look like the through holes in outward appearance, improving the appearance.

In a fourth invention, the non-through hole and the sound insulation holes are arranged at the central part of the region where the sound output holes are arranged.

With the above arrangement, the non-through holes and the sound insulation holes, which do not allow sound to pass therethrough, are interposed by the through holes that allow sound to pass therethrough.

In a fifth invention, the speaker is arranged at the central part of the region where the sound output holes are arranged.

With the above arrangement, sound from the speaker is output through the through holes that interpose the non-through holes and the sound insulation holes.

In a sixth invention, the sound output holes are arranged in a symmetric pattern.

The above arrangement enables symmetric sound output from a single speaker, eliminating the need to provide a plurality of speakers.

In a seventh invention, the mesh sheet, the two-sided tape, and the transparent sheet are attached to an inner face of the cabinet, the mesh sheet covers at least all of the through holes, the two-sided tape has a two-sided tape opening that surrounds at least all of the through holes, and the transparent sheet has transparent sheet openings that surround only the through holes except the sound insulation holes.

The above simple construction enables further easy control of the sound quality with no design modification necessitated.

In an eighth invention, the two-sided tape has a plurality of two-sided tape positioning holes, the transparent sheet has a plurality of transparent sheet positioning holes corresponding to the two-sided tape positioning holes, and positioning protrusions are formed on the cabinet so as to correspond to the two-sided tape positioning holes and the transparent sheet positioning holes.

The above arrangement facilitates positioning of the two-sided tape and the transparent sheet, contemplating enhancement of workability.

In a ninth invention, sound leak preventing means for preventing sound from the speaker from leaking is provided.

With the above arrangement, the sound leak preventing means prevents annoying sound from the speaker from leaking.

In a tenth invention, the sound leak preventing means includes a speaker cushion provided on the speaker and a rubber cushion provided on the cabinet which adhere to each other.

With the above arrangement, sound from the speaker can be prevented from leaking surely in an easily assembled construction.

In an eleventh invention, the portable communication tool is a mobile phone.

The above arrangement attains a good-looking mobile phone with excellent sound quality.

As described above, according to the present invention, free change in sound quality necessitates no design modification, attaining a good-looking portable communication tool with excellent sound quality.

DESCRIPTION OF THE PREFERRED EMBODIMENTS

Embodiments of the present invention will be described below with reference to the accompanying drawings.

Figure 1:
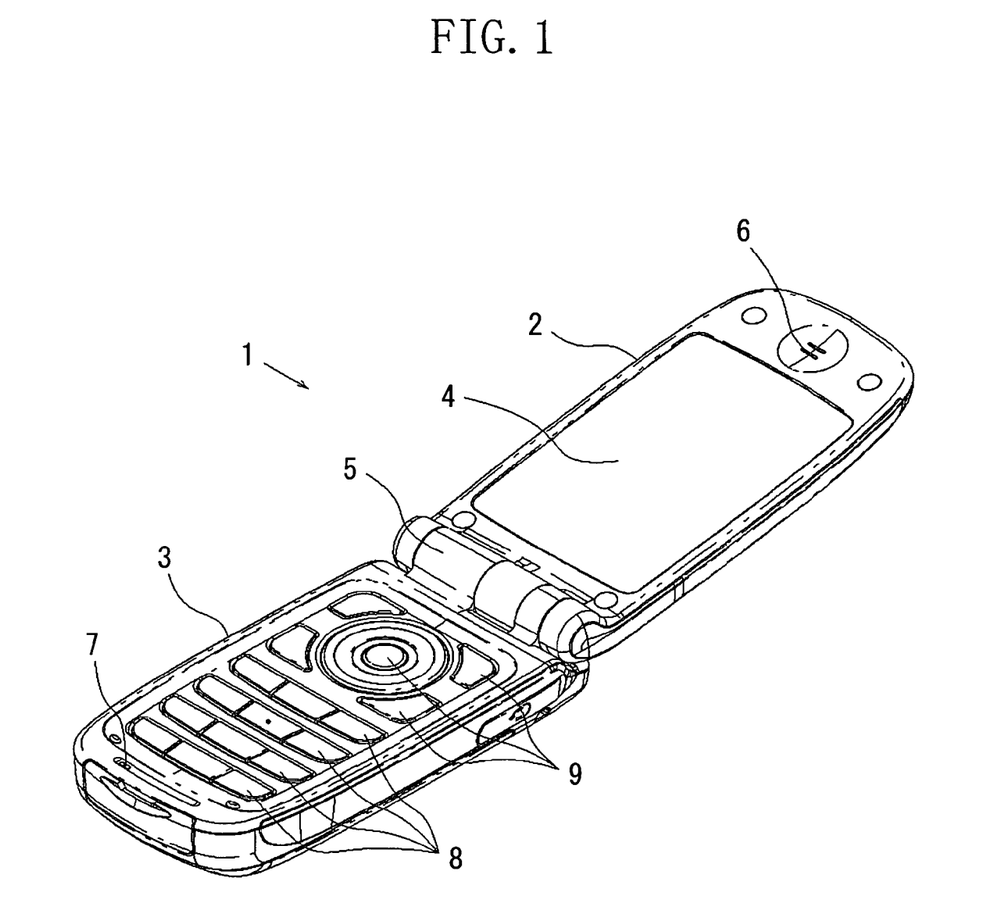
FIG. 1 is a perspective view of a mobile phone according to an embodiment of the present invention in an open state as viewed from the right.
Figure 2:
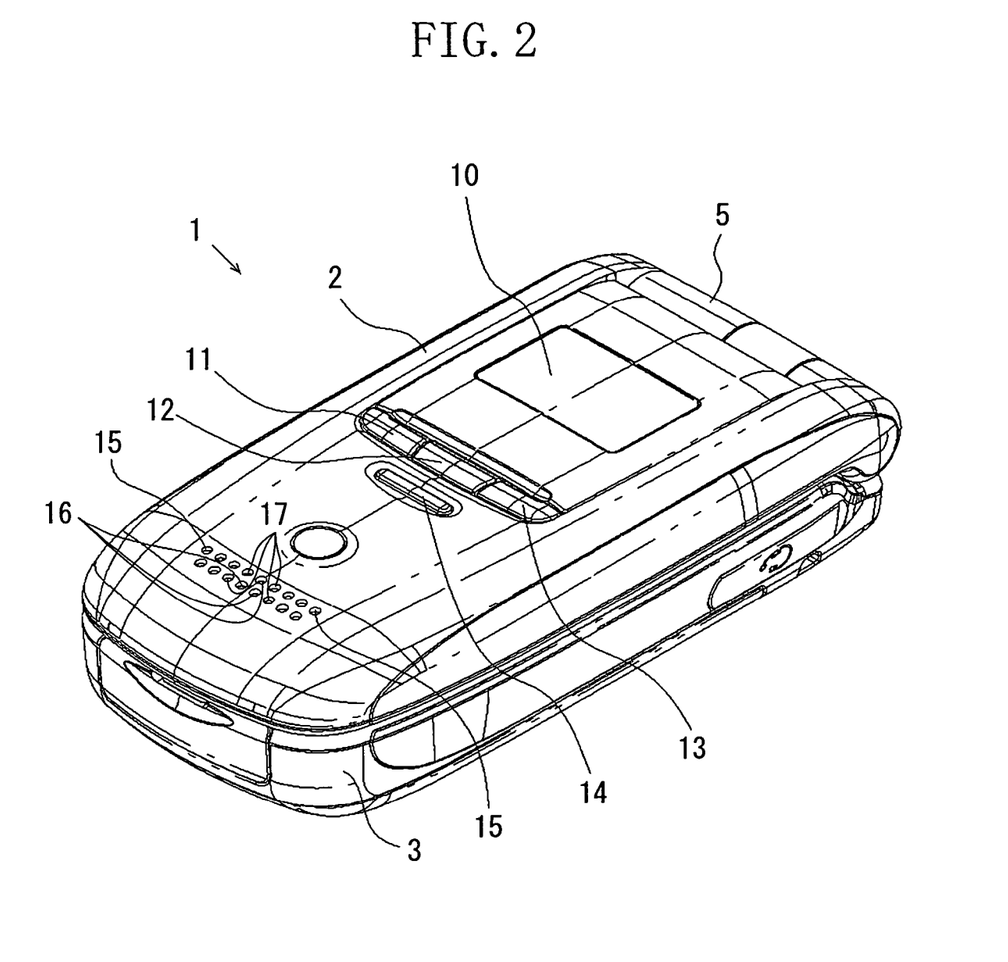
FIG. 2 is a perspective view of the mobile phone in a closed state as viewed from the right.

FIG. 1 is a perspective view of a mobile phone as a portable communication tool according to one embodiment of the present invention in an open state as viewed from the right. FIG. 2 is a perspective view of the mobile phone of FIG. 1 in a closed state as viewed from the right.

As shown in FIG. 1 and FIG. 2, the mobile phone 1 of the present embodiment includes a first box body 2 and a second box body 3, which are joined to each other by means of a hinge 5 so that the mobile phone 1 is capable of being opened or closed.

A liquid crystal display section 4 and a receiver 6 are provided on the obverse side (inside) of the first box body 2, while there are provided on the reverse side (outside) thereof a rewinding button 11 for audio, a stop/replay button 12, a fast-forward button 13, a menu button 14, a sub display section 10 for displaying incoming for confirmation, displaying a menu, or displaying a clock in unused state, and the like.

On the obverse side of the second box body 3, there are provided a microphone 7, information input buttons 8, and function buttons 9. Also, a camera section and a battery lid are provided on the reverse side of the second box body 3, though not shown.

For performing communication, such as telephone conversation or mailing, the mobile phone 1 are opened. Incoming confirmation, listening to music and the like are possible with the mobile phone 1 closed.

Figure 3:
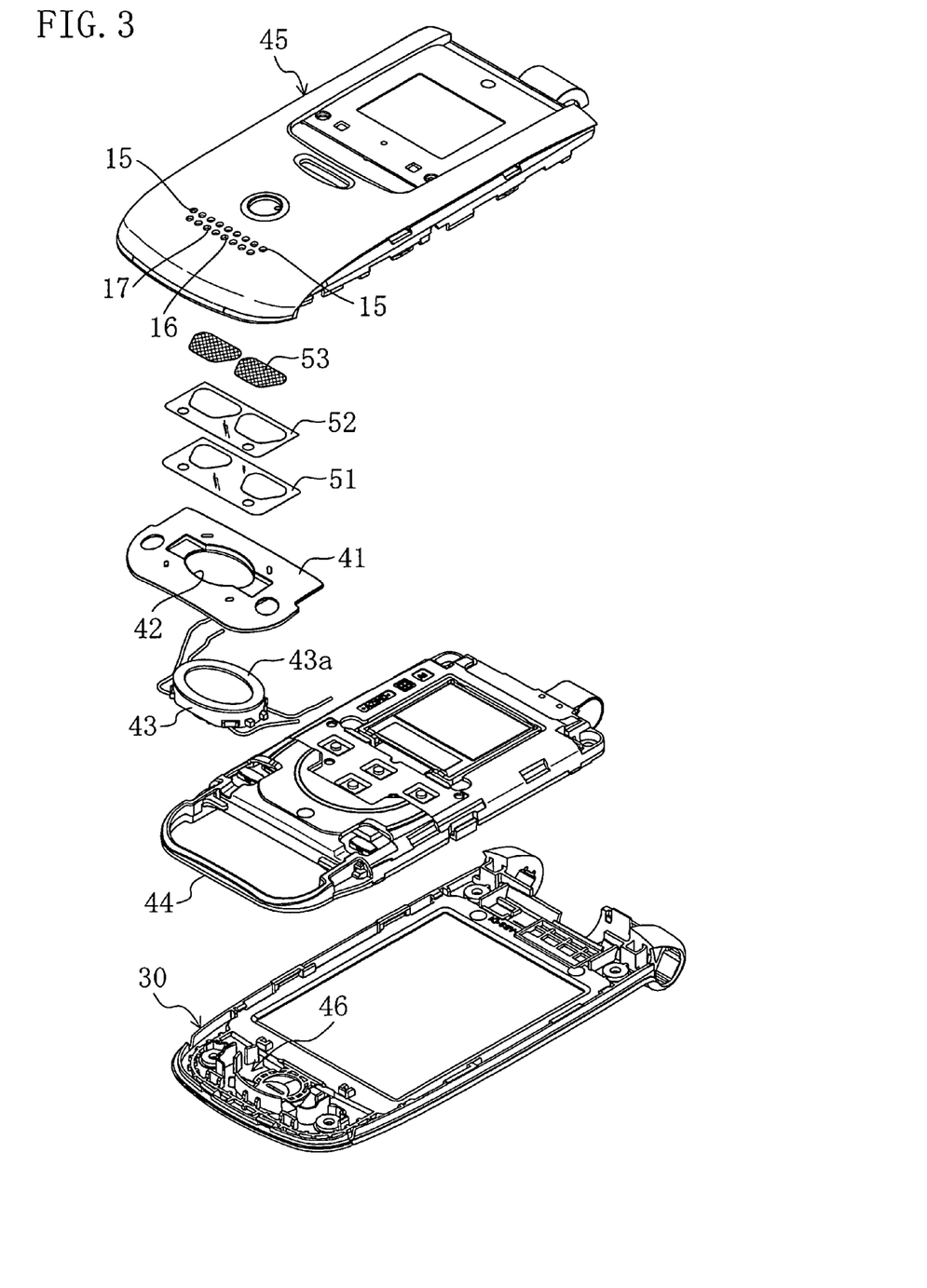
FIG. 3 is an exploded view of a first box body and inside parts of the mobile phone.

As shown by exploding the mobile phone 1 in FIG. 3, the first box body 2 includes an obverse side cabinet 30 and a reverse side cabinet 45. First to third sound output holes 15, 16, 17 are formed in the reverse side cabinet 45. As shown in an enlarged scale in FIG. 4, the second sound output holes 16 (three in number in the present embodiment) of the three kinds of sound output holes 15, 16, 17 which are located at the central part, do not pass through the reverse side cabinet 45 and form non-through holes recessed in the obverse side portion thereof. With respect to the second sound output holes 16, the first sound output holes 15 and the third sound output holes 17, which pass through the reverse side cabinet 45 as through holes, are arranged in a symmetric pattern. The arrangement of the second sound output holes 16 of non-through holes only recessed in the obverse side portion minimizes difference in outlook appearance from the first sound output holes 15 and the third sound output holes 17, attaining excellent appearance.

A speaker receiving portion 46 is formed in the obverse side cabinet 30, at which a speaker 43 is arranged. A rubber cushion 41 for preventing sound from leaking covers the speaker 43 from above as sound leak preventing means. A speaker window 42 is formed at the central part of the sound leak preventing cushion 41. An annular speaker cushion 43a is attached on the obverse face of the speaker 43 as sound leak preventing means. The first box body 2 is formed by assembling the obverse side cabinet 30 and the reverse side cabinet 45 with a magnesium frame 44 interposed therebetween. The sound leak preventing cushion 41 and the speaker cushion 43a are in contact with and adhere to each other, thereby preventing sound from the speaker 43 from leaking. Thus, sound from the speaker 43 is surely prevented from leaking in an unintentional direction with such an easily assembled construction.

As described above, the speaker 43 is arranged in back of the first to third sound output holes 15, 16, 17, whereby sound from the speaker 43 is output with the mobile phone 1 closed. The speaker 43 outputs sound recorded in the main body, sound recorded in an SD card, or sound of a TV program received from television.

Figure 5:
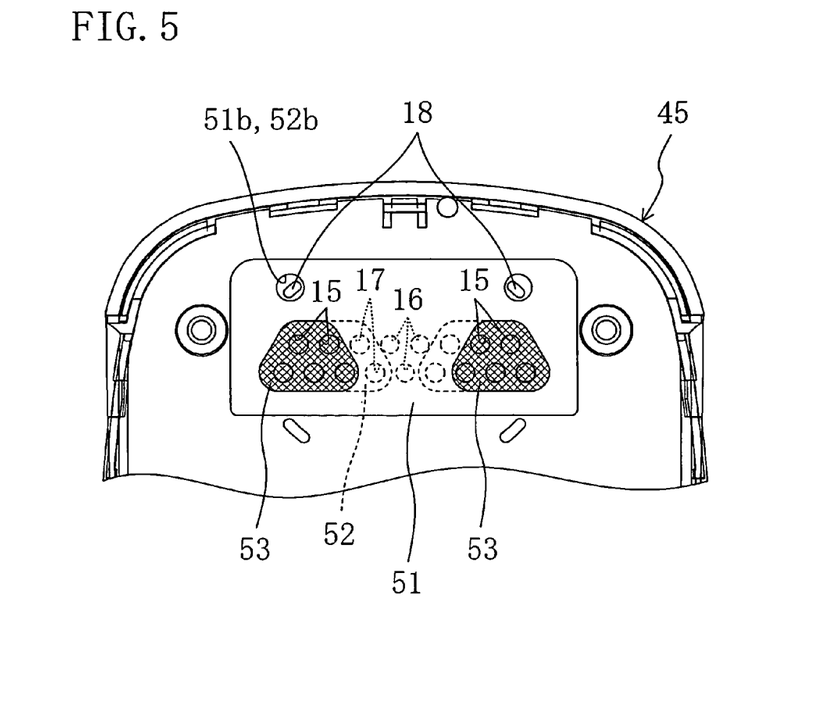
FIG. 5 is a plan view showing a state where mesh sheets, a two-sided tape, and a transparent sheet are attached to the reverse side cabinet of the mobile phone.
Figure 6:
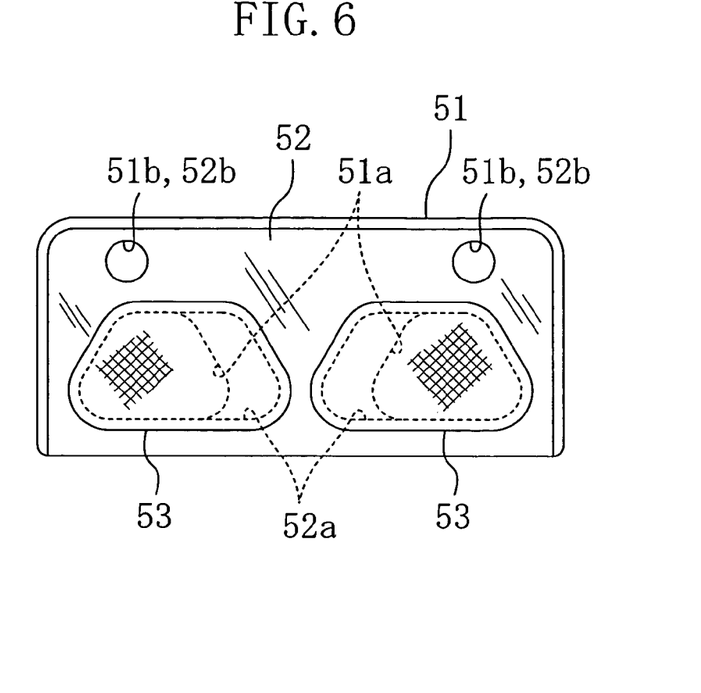
FIG. 6 is a plan view showing a state of the obverse side of the mobile phone where the mesh sheets, the two-sided tape, and the transparent sheet are assembled.

As shown in FIG. 5, a transparent sheet 51, a two-sided tape 52, and mesh sheets 53 are attached to the reverse face (a core side) of the reverse side cabinet 45. The transparent sheet 51, the two-sided tape 52, and the mesh sheets 53 are assembled in a state where the transparent sheet 51 and the mesh sheets 53 are attached to the respective faces of the two-sided tape 52, as shown in FIG. 6.

Figure 7:
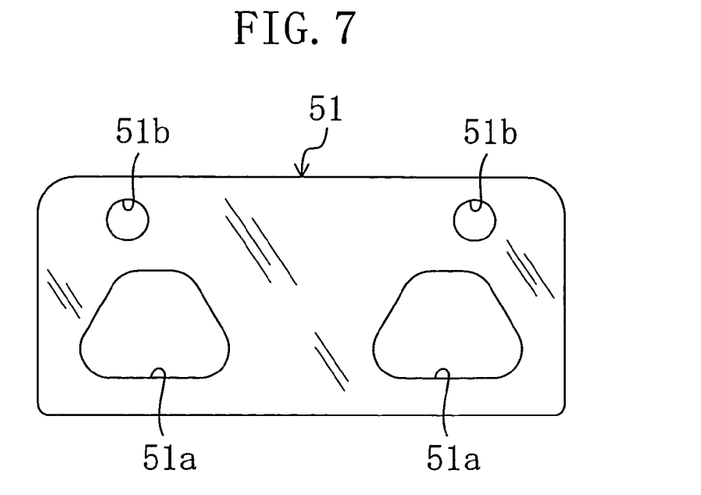
FIG. 7 is a plan view showing the transparent sheet of the mobile phone.

As shown in FIG. 7, the transparent sheet 51 is in a rectangular shape and has a pair of transparent sheet openings 51a each in a rounded trapezoidal shape and a pair of positioning holes 51b each in a round shape.

Figure 8:
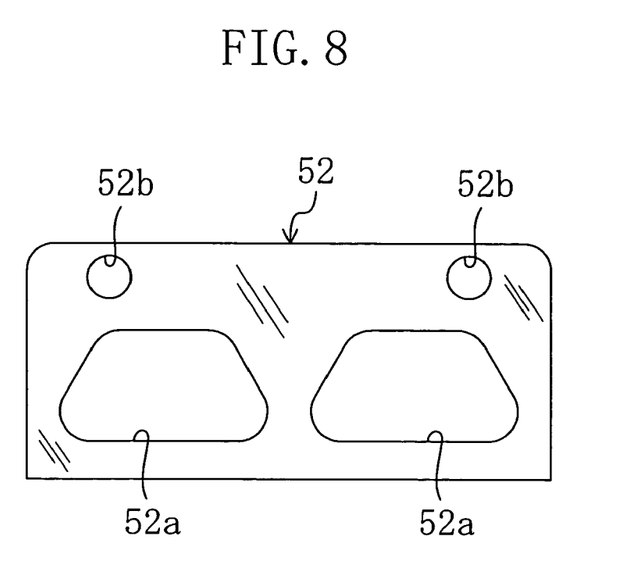
FIG. 8 is a plan view showing the two-sided tape of the mobile phone.

As shown in FIG. 8, the two-sided tape 52 is slightly smaller than the transparent sheet 51. The two-sided tape 52 has a pair of two-sided tape openings 52a formed at parts corresponding to the transparent sheet openings 51a. The width of the two-sided tape openings 52a is larger towards the center of the tow-sided tape 52 than the transparent sheet openings 51a. A pair of positioning holes 52b are formed at parts corresponding to the positioning holes 51b of the transparent sheet 51, as well.

Figure 9:
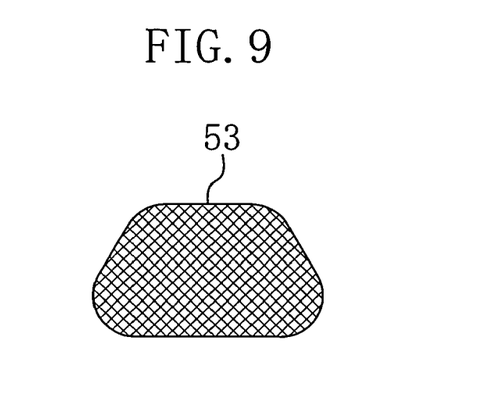
FIG. 9 is a plan view showing a mesh sheet of the mobile phone.

As shown in FIG. 9, each mesh sheet 53 is made of a mesh material slightly larger than the two-sided tape openings 52a.

As shown in FIG. 5, an assembly of the transparent sheet 51, the two-sided tape 52, and the mesh sheets 53 is attached to the reverse side cabinet 45 in such a way that a pair of positioning protrusions 18 formed on the reverse side cabinet 45 are inserted in the respective positioning holes 51b, 52b. This facilitates positioning of the two-sided tape 52 and the transparent sheet 51, contemplating enhancement of the workability.

Accordingly, the first sound output holes 15 arranged on the right and left sides are covered with only the mesh sheets 51 to allow sound to pass therethrough. While, the third sound output holes 17 located inwardly of the right and left first sound output holes 15 are covered with the mesh sheets 53 and the transparent sheet 51 and serves as sound insulation holes that does not allow sound to pass therethrough, though they look like through holes. Thus, the third sound output holes 17 look like the first sound output holes 15 and become good-looking. The second sound output holes 16 located at the central part are non-through holes to allow no sound to pass therethrough.

Figure 4:
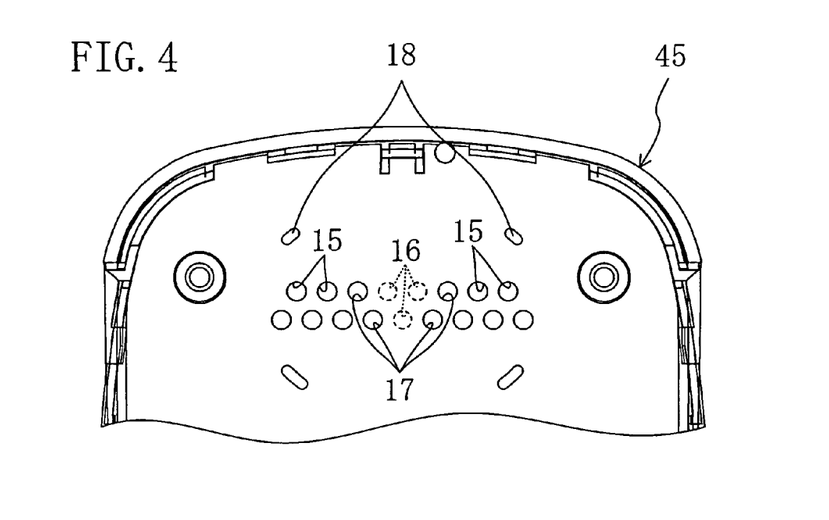
FIG. 4 is a plan view of sound output holes and a peripheral part thereof of a reverse side cabinet of the mobile phone as viewed from the back.

As described above, the second sound output holes 16 are non-through holes, of which number is three. Further, in the present embodiment, the number of the first sound output holes 15, which are through holes, is ten in total, wherein five of them are arranged right or left. The number of the third sound output holes 17, which serve as sound insulation holes, are four in total, wherein two of them are arranged right or left. Thus, the first to third sound output holes 15, 16, 17 are arranged is in a symmetric pattern. The speaker 43 is arranged so that the center thereof is located immediately below the second sound output holes 16. With this arrangement, sound from the speaker 43 is output through the first sound output holes 15 that interpose the second sound output holes 16 and the third sound output holes 17, enabling symmetrical sound output from the single speaker 43. This means elimination of the need to provide a plurality of speakers 43. Further, such a simple construction attains easy control of the sound quality with no design modification necessitated.

The first to third sound output holes 15, 16, 17, the transparent sheet 51, the two-sided tape 52, and the mesh sheets 53 compose sound output control means for controlling the direction of sound output from the speaker 43.

—Effects of the Embodiment—

As described above, according to the present embodiment, the direction of sound output from the speaker 43 can be controlled with such a easily-assembled and simple construction at low cost. The control of the direction of sound output from the speaker 43 widens the range where the sound quality is changeable. Further, since the sound quality can be changed freely with no design modification necessitated, a good-looking mobile phone with excellent sound quality can be attained.

—Acoustic Characteristic Tests—

Each number of the first to third sound output holes 15, 16, 17 described above is set optimally according to results of acoustic characteristic tests.

While it is desirable that all of the first to third sound output holes 15, 16, 17 are through holes so that the mobile phone 1 can have excellent coordinated outward appearance as a whole, the acoustic characteristic tests found that when each of the first to third sound output holes 15, 16, 17 is a through hole, high-pitched sound becomes loud to cause annoying sound.

In order to examine how to remove such annoying sound, the following three acoustic characteristic tests were carried out.

Figure 10:
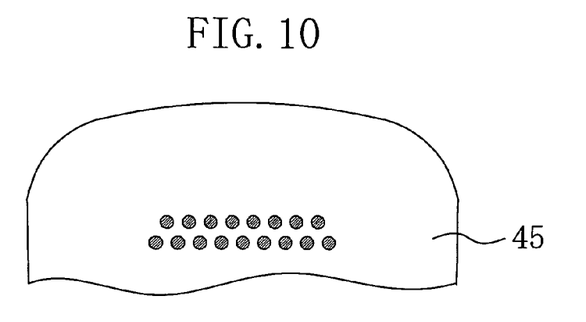
FIG. 10 is a plan view showing an arrangement of the sound output holes in Case A in an acoustic characteristic test.

Case A: Through holes that pass through the reverse side cabinet 45 are formed as the first to third sound output holes 15, 16, 17 so as to allow sound to pass therethrough (see FIG. 10).

Figure 11:
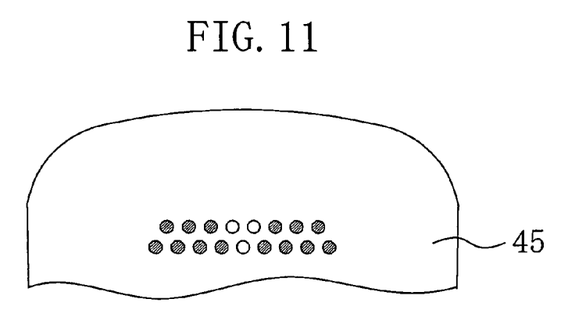
FIG. 11 is a plan view showing an arrangement of the sound output holes in Case B in an acoustic characteristic test.

Case B: Through holes that passes through the reverse side cabinet 45 are formed as the first sound output holes 15 and the third sound output holes 17 so as to allow to sound to pass therethrough, while non-through holes that do not pass through the reverse side cabinet 45 are formed as the second sound output holes 16 so as not to allow sound to pass therethrough (see FIG. 11).

Figure 12:
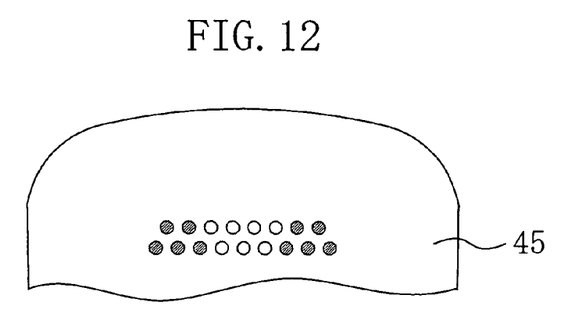
FIG. 12 is a plan view showing an arrangement of the sound output holes in Case C in an acoustic characteristic test.

Case C: Through holes that pass through the reverse side cabinet 45 are formed as the first sound output holes 15 so as to allow to sound to pass therethrough, while non-through holes that do not pass through the reverse side cabinet 45 are formed as the second and third sound output holes 16, 17 so as not to allow sound to pass therethrough (see FIG. 12).

Figure 13:
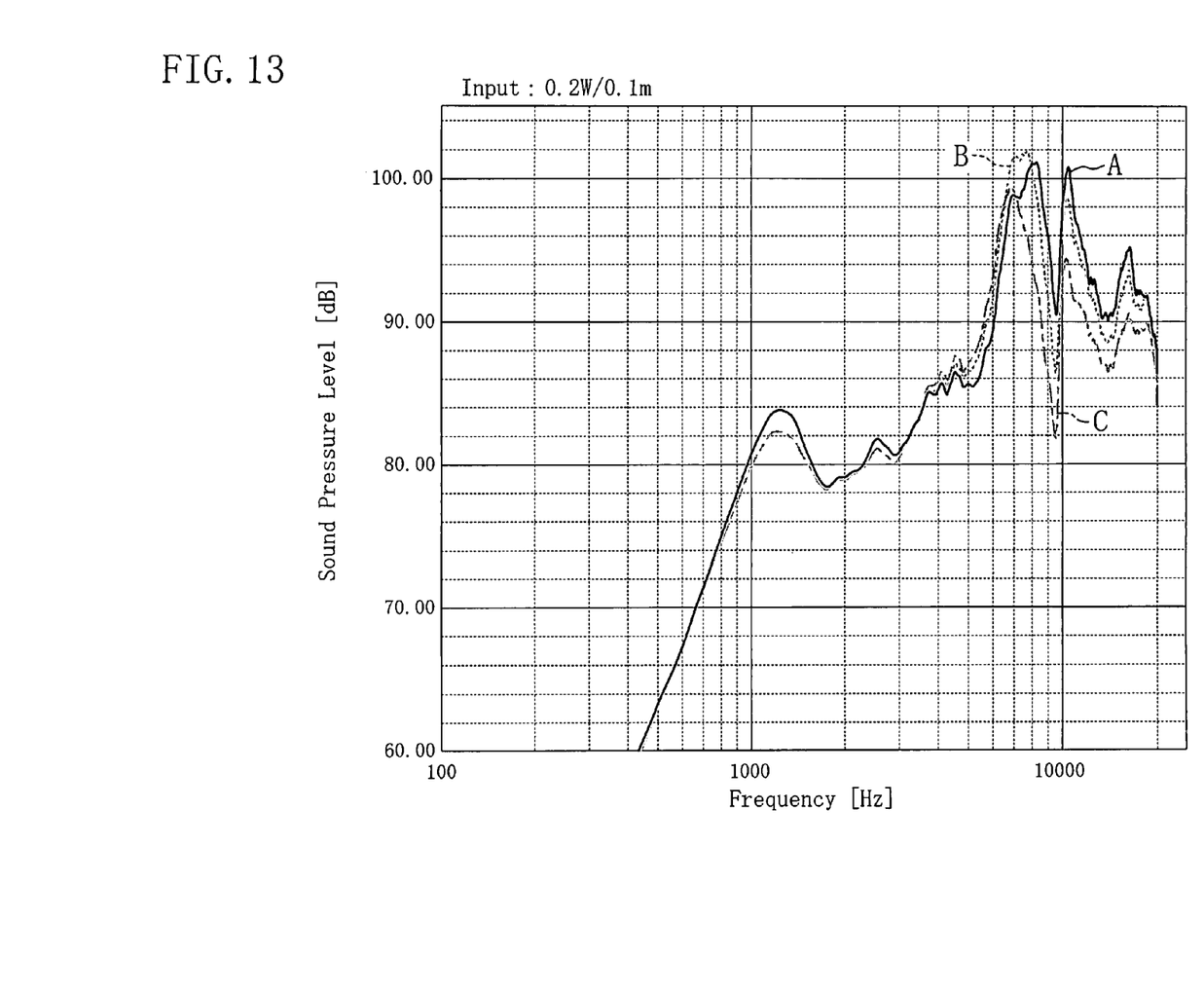
FIG. 13 is a graph showing acoustic characteristics of a speaker in each case.

The results of the three acoustic characteristic tests are indicated in FIG. 13.

Data obtained from Case A shows a peak of sound pressure at around 8500 Hz.

Data obtained from Case B shows a peak of sound pressure at around 7700 Hz.

Data obtained from Case C
shows a peak of sound pressure at around 6900 Hz.

The results indicate that of the three acoustic characteristic tests, Case C reduces annoying sound the most.

Case C, however, provides seven non-through holes, which is less attractive in view of design. In other words, it was found that favorable results of the acoustic characteristic tests lead to poor design while excellent design leads to inferior results of the acoustic characteristic tests.

Under the circumstances, the present invention sets a peak of sound pressure at 6900 Hz, and the third sound output holes 17 of through holes that pass through the reverse side cabinet 45 are covered with the transparent sheet 51 and the mesh sheets 53 so as to look like through holes in view of design. Accordingly, only the second sound output holes 16 (three in number) are made to look like non-through hole.

Hence, in view of design, only the second sound output holes 16 are non-through holes while the first and third sound output holes 15, 17 look like through holes. In view of the acoustic characteristic tests, sound is output through only the transparent sheet openings 51a, bringing the peak at 6900 Hz as in Case C in the acoustic characteristic stets.

Other Embodiment

The present invention may have the following construction in the above embodiment.

Namely, each number and each position of the sound output holes 15, 16, 17 are determined according to the results of the acoustic characteristic tests but are not limited thereto. Specifically, for changing the size or the total number of the sound output holes, similar acoustic characteristic tests leads to determination of optimum numbers and positions thereof.

It should be noted that the above embodiments are substantially mere preferred examples and are not intended to limit the scope of the present invention, an applicable range, and use.

What is claimed is:

1. A portable communication tool, comprising:
a cabinet;
a speaker for outputting sound; and
sound output control means for controlling a direction of sound output from the speaker, the sound output control means including a plurality of sound output holes formed in the cabinet, a mesh sheet, a transparent sheet having a pair of openings, and a two-sided tape attached to both the mesh sheet and the transparent sheet, on either side, and provided for attaching the mesh sheet, and the transparent sheet to a cabinet, wherein
the sound output holes include a plurality of through holes that pass through the cabinet, and a non-through hole recessed in an obverse face portion of the cabinet so as not to pass through the cabinet,
the non-through hole is arranged at a central part of a region where the sound output holes are arranged, and
some of the through holes passing through the cabinet are covered with the transparent sheet to serve as sound insulation holes that do not allow sound to pass therethrough.

2. The portable communication tool of claim 1,
wherein the non-through hole and the sound insulation holes are arranged at the central part of the region where the sound output holes are arranged.

3. The portable communication tool of claim 2,
wherein the speaker is arranged at the central part of the region where the sound output holes are arranged.

4. The portable communication tool of claim 3,
wherein the sound output holes are arranged in a symmetric pattern.

5. The portable communication tool of claim 3,
wherein the mesh sheet, the two-sided tape, and the transparent sheet are attached to an inner face of the cabinet,
the mesh sheet covers at least all of the through holes,
the two-sided tape has a two-sided tape opening that surrounds at least all of the through holes, and
the transparent sheet has transparent sheet openings that surround only the through holes except the sound insulation holes.

6. The portable communication tool of claim 3,
wherein the two-sided tape has a plurality of two-sided tape positioning holes,
the transparent sheet has a plurality of transparent sheet positioning holes corresponding to the two-sided tape positioning holes, and
positioning protrusions are formed on the cabinet so as to correspond to the two-sided tape positioning holes and the transparent sheet positioning holes.

7. The portable communication tool of claim 3, further comprising:
sound leak preventing means for preventing sound from the speaker from leaking.

8. The portable communication tool of claim 7,
wherein the sound leak preventing means includes a speaker cushion provided on the speaker and a rubber cushion provided on the cabinet which adhere to each other.

9. The portable communication tool of claim 3,
wherein the portable communication tool is a mobile phone.

* * * * *